July 18, 1967 G. H. THOMAS ETAL 3,331,252
ELECTRONIC VIBRATION ANALYZING APPARATUS
Filed March 23, 1965 3 Sheets-Sheet 2

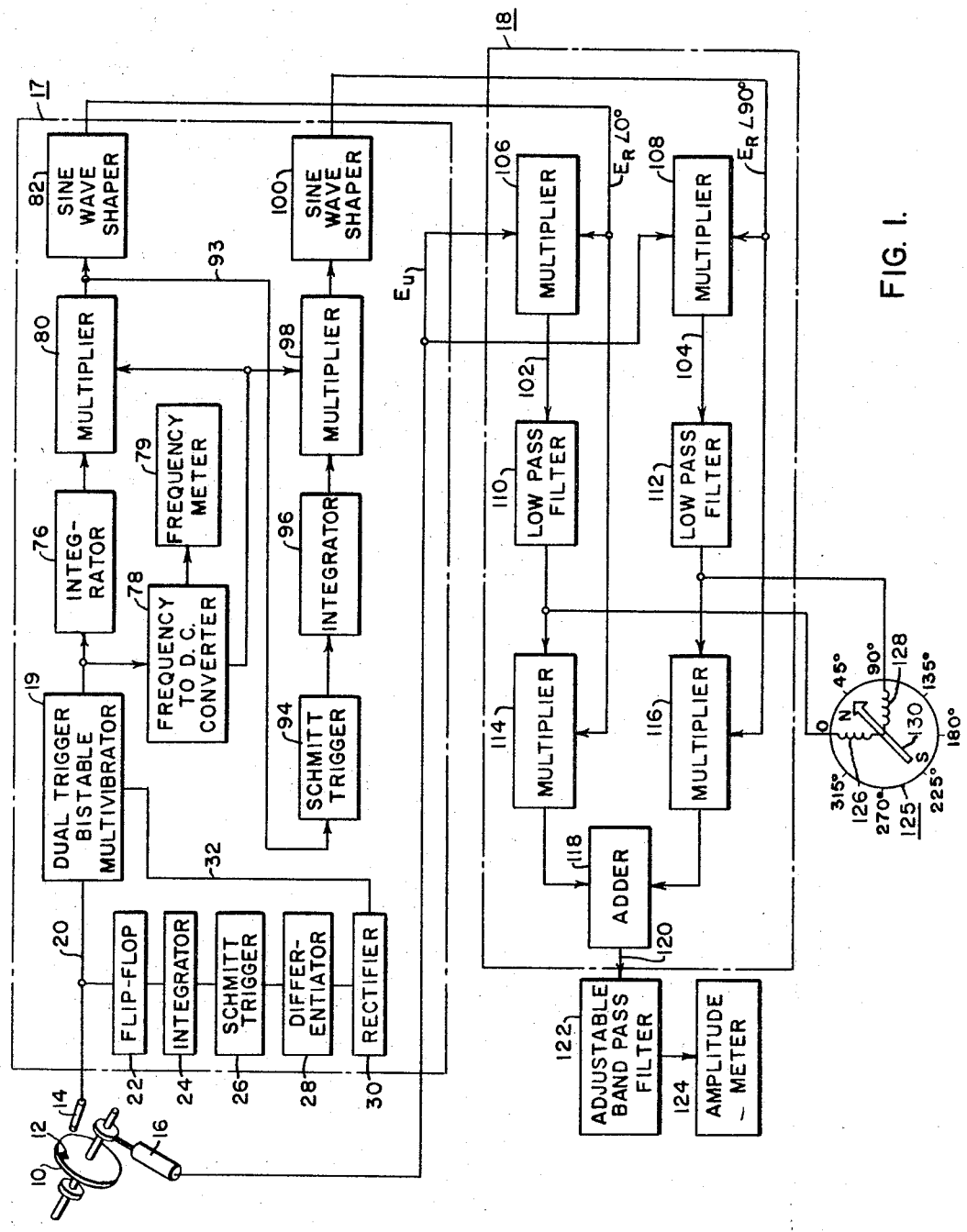

INVENTORS
Glen H. Thomas and
Robert S. Morrow.
BY
ATTORNEY

July 18, 1967  G. H. THOMAS ETAL  3,331,252
ELECTRONIC VIBRATION ANALYZING APPARATUS
Filed March 23, 1965  3 Sheets-Sheet 3

INVENTORS
Glen H. Thomas and
Robert S. Morrow.
BY
ATTORNEY

United States Patent Office 3,331,252
Patented July 18, 1967

3,331,252
ELECTRONIC VIBRATION ANALYZING
APPARATUS
Glen H. Thomas and Robert S. Morrow, Columbus, Ohio, assignors to International Research and Development Corporation, Worthington, Ohio, a corporation of Ohio
Filed Mar. 23, 1965, Ser. No. 442,149
11 Claims. (Cl. 73—462)

This application is a continuation-in-part of copending application Ser. No. 359,335, filed Apr. 13, 1964, which application was abandoned and refiled as continuation application Ser. No. 571,646 on Aug. 10, 1966, the latter application issuing as Patent No. 3,307,408 on Mar. 7, 1967. Both of said applications and the resulting patent are assigned to the assignee of the present application.

This invention relates to apparatus for balancing rotating bodies and the like, and more particularly to apparatus of the type described which has a wide range of applications to various balancing operations.

As is known, vibration analyzing apparatus must be capable of measuring the magnitude, frequency and phase of vibration caused by a rotating body. Furthermore, when there are two or more sources of unbalance in a piece of equipment to be balanced, as is quite often the case, the analyzing equipment must be capable of separating a particular frequency associated with a single vibrating part from all other frequencies in order to effect a balancing operation.

In order to sense mechanical vibrations, the analyzing apparatus utilizes an electromagnetic transducer which transforms the vibrations into an electrical signal having a frequency equal to that of the vibrations, an amplitude proportional to the magnitude of the vibrations, and a phase displacement relative to a reference signal which is related to the location of the point of unbalance on a rotating body. The resulting vibration signal is then applied to apparatus including an amplitude meter for indicating displacement of the vibrations, a frequency meter for indicating the signal frequency, a filter to separate selected frequencies of vibration for individual measurement, and a phase determining means such as a phase meter or strobe light.

The present invention is concerned with improvements in vibration analyzing apparatus of the type described above and, more specifically, is concerned with improvements in the filtering and phase determining elements of vibration analyzing apparatus which enable the equipment to be used in almost any desired balancing problem. These elements will be considered separately as follows:

*Filtering apparatus*

As will be appreciated, the filter utilized in vibration analyzing equipment must be of the band-pass type in order to separate the frequency of the displacement signal due to a single vibrating part from signals of all other frequencies. Since the speed of rotation of various bodies to be balanced by the analyzing equipment will be different, the filter must be turnable if the equipment is to have anything other than a very limited range of applications. In most prior-art analyzing equipment, therefore, a filter was provided which was tuned by means of a manual adjustment.

In cases where it becomes necessary to balance an internal combustion engine or the like, there may not only be several sources of unbalance but, in addition, the instantaneous speed of rotation of the various parts of the engine may continually vary. For instance, the speed of an internal combustion engine with a throttle adjustment set for 1500 revolutions per minute may actually vary from this value by, say, plus or minus 100 revolutions per minute. In this case, the frequency of the alternating current signal passing through the band-pass filter of the analyzing equipment will vary correspondingly. As a result, it becomes necessary to employ a synchronous band-pass filter in which the pass-band varies as a function of the speed of the rotating body being analyzed, or to employ a band-pass filter which will pass a relatively wide range of frequencies. In either case, the band of frequencies is usually limited, making the equipment of limited adaptation; and problems are encountered due to phase shifts introduced into the signals as they pass through the filter.

As will be seen, the present invention provides vibration analyzing apparatus which accommodates vibration signals of instantaneously varying frequency such as those encountered in balancing operations on internal combustion engines. In this respect, the filtering means of the vibration analyzing equipment is one in which the pass-band can be varied synchronously and automatically with changes in engine speed. In addition, the band of frequencies which the synchronous filter can pass is very wide. Moreover no phase shifts occur in passing through the filter. This, coupled with the fact that the filter automatically adjusts itself to the speed of rotation of the part being analyzed, eliminates the need for any manual tuning before a balancing operation as was necessary in prior-art devices of this type.

*Phase determining means*

As was mentioned above, the phase determining means of vibration analyzing equipment may comprise a strobe light or phase meter. If a strobe light is employed, it is caused to flash on and off at a rate determined by the frequency of the vibration such that when it is directed onto a rotating body having a reference mark thereon, the mark appears "frozen" in place. Since the position of the reference mark changes when the position of the unbalance is changed, the mark can be used to determine the correct place for making weight corrections.

The difficulty with utilizing a strobe light in analyzing equipment intended for universal application, however, is that in certain cases the part to be balanced cannot be observed readily, and in other cases the use of a strobe light is dangerous as where it is necessary to balance an aircraft propeller or the like. Furthermore, the use of a strobe light requires that the operator of the equipment continually exchange his attention between the rotating body and the amplitude and frequency meters on a console, a procedure which is somewhat cumbersome.

Phase meters have been employed in the past in cases where the use of a strobe light is impractical or impossible. Such phase meters eliminate the problem of requiring the operator to continually change his attention from the rotating part to the amplitude and frequency meters since the phase meter may be mounted on the same console as the other meters. However, phase meters utilized in the past are not entirely satisfactory for the reason that they do not indicate a continous 360° phase angle.

As will be seen, the present invention provides improved balancing apparatus which incorporates a phase meter having a continuous 360° indication such that the position of a pointer on the meter is the same as that of a reference mark or indicia which appears frozen in place on the body being rotated under the influence of a strobe light. This not only simplifies the balancing operation for the operator of the equipment, but also enables the vibrational characteristics of the rotating body to be analyzed over a wide range. That is, as the speed of an unbalanced body is increased from a low value to a higher value, it will pass through one or more resonant frequency speeds. These resonant speeds can be observed on the phase meter of the invention as an erratic oscillation of the phase meter pointer, which oscillation is preceded and superseded by a steady-state position of the meter pointer. Thus, with the present invention, the resonant speeds can be plotted over an expected range of speeds, a procedure impossible with prior-art equipment. Furthermore, the system serves as a means for avoiding attempts to balance the body at a resonant speed where erratic results are obtained.

From the foregoing, it will be appreciated that the objects of the invention include:

To provide vibration analyzing apparatus having a wide range of applications, including balancing of rotating bodies of continually varying speed;

To provide electronic balancing apparatus which requires no manual adjustment of band-pass filter means, regardless of the speed of the body being balanced;

To provide vibration analyzing apparatus in which the only connection to the body being balanced is by an electromagnetic transducer which senses the magnitude and frequency of the vibrations;

To provide balancing apparatus employing a phase meter having a complete 360° range; and To provide balancing apparatus wherein resonant speeds of an unbalanced rotating body can be observed over a wide range of speeds.

The above and other objects and features of the invention will become apparent from the following detailed description taken in connection with the accompanying drawings which form a part of this specification, and in which:

FIGURE 1 is a block diagram of the overall balancing system of the invention;

FIG. 2 comprises waveforms illustrating the operation of the sine wave generating circuitry shown in FIG. 1;

Figure 3:
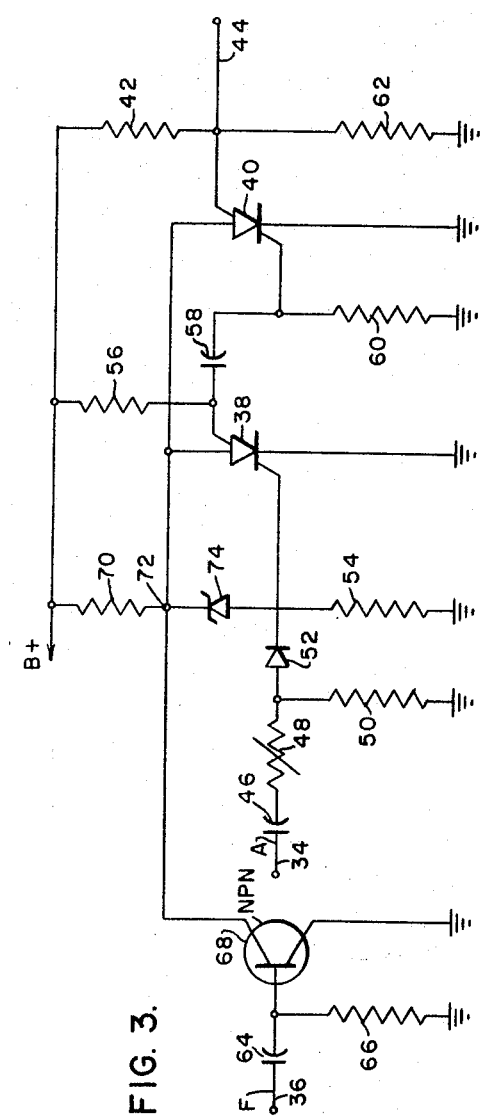
FIG. 3 is a detailed schematic circuit diagram of the dual trigger bistable multivibrator utilized in the system of FIG. 1.

With reference now to the drawings, and particularly to FIG. 1, a rotating member 10 is shown which, in the example given, is light-colored and has a dark spot 12 at one point around its periphery such that a photocell 14 will be actuated once during each rotation of the member 10 at precisely the same point. Alternatively, the spot 12 could be replaced by a member which affects a magnetic field, such as a slot or a rib in a magnetically permeable body; and the photocell 14 replaced by a magnetic pickup, with the same overall effect. The vibrations caused by the rotating member 10 are sensed by an electromagnetic transducer or vibration pickup 16 which produces an alternating current signal as member 10 rotates, this signal having a frequency equal to the rotational speed of the member 10 and an amplitude or displacement proportional to the magnitude of vibrations induced in member 10. Suitable transducers for this purpose are described, for example, in U.S. Patent Nos. 2,754,435 and 3,157,852.

The circuitry of the vibration analyzing apparatus includes two elements enclosed by broken lines and identified generally by the numerals 17 and 18, respectively. The element 18 comprises the synchronous filter of the invention which requires for its operation two sine wave signals 90° out of phase with respect to each other and having a frequency equal to the rotational speed of the body 10 being balanced. While such signals can be obtained from a tachometer mechanically connected to the rotating body 10 and a phase shift circuit, it is sometimes inconvenient or impossible to make such a mechanical connection. Accordingly, the since wave generator 17 is employed which converts the pulses from photcell 14 into the required two sine wave signals displaced 90° with respect to each other.

Figure 2:
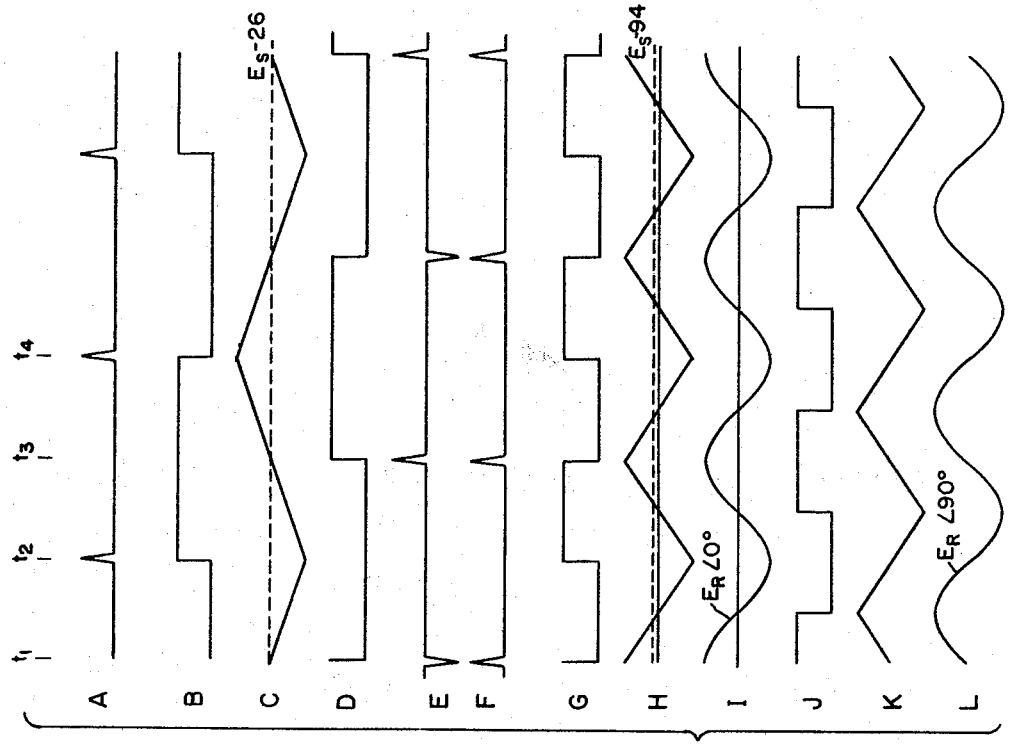

With reference to the sine wave generator 17, it is described in detail in copending application Ser. No. 442,150, filed concurrently herewith and assigned to the assignee of the present application. The pulses from photocell 14, illustrated as waveform A in FIG. 2, are applied to one input terminal of a dual trigger bistable multivibrator 19 through conductor 20. The pulses on conductor 20 are also applied to a flip-flop circuit 22, the output of the flip-flop circuit 22 appearing as waveform B in FIG. 2. By integrating the waveform B in integrator 24, waveform C of FIG. 2 is produced. This waveform is applied to a Schmitt trigger circuit 26. As is known, a Schmitt trigger circuit is a type of multivibrator which will shift from one stable state to the other whenever the magnitude of an input signal rises above a predetermined amplitude. The circuit will remain in its other stable state until the magnitude of the input signal falls below the aforesaid predetermined amplitude. Therefore, by causing the circuit 26 to fire at the voltage level $E_s$–26 shown on waveform C, the waveform D will be produced. This latter waveform, it will be noted, is displaced 180° with respect to waveform B.

The resulting waveform D from circuit 26 is then applied to a differentiator 28 which produces waveform E of FIG. 2 comprising a series of spiked pulses, a positive pulse appearing at the leading edge of each square-wave pulse in waveform D and a negative pulse appearing at the trailing edge. By passing waveform E through a rectifier cuit 26 to fire at the voltage level $E_s$–26 shown on waveform F wherein the spiked pulses are intermediate those in waveform A. That is, assuming that the pulses in waveform A occur when the mark 12 on member 10 is at the top high noon position, pulses in waveform B will occur when the mark 12 is displaced 180° with respect to its top high noon position.

The dual trigger bistable multivibrator 19 is shown in detail in FIG. 3 and includes a first input terminal 34 to which the pulses in waveform A are applied, and a second input terminal 36 to which the pulses in waveform F are applied. The multivibrator proper includes two silicon controlled switches 38 and 40 connected such that when one switch 38 or 40 conducts the other is cut off, and vice versa.

At time $t_1$ shown in FIG. 2, the switch 40 will conduct, whereby current from the B+ voltage source will flow through resistor 42 to drive the output terminal 44 less positive. This appears in waveform G of FIG. 2 following the time $t_1$. This condition will exist with the switch 40 conducting until time $t_2$ is reached in FIG. 2. At this time, a pulse in waveform A is applied through capacitor 46 and variable resistor 48 across resistor 50. The pulse is also applied through diode 52 across resistor 54; and the resulting voltage across resistor 54 applies a positive bias to the gate electrode of the silicon controlled switch 38, whereupon the switch 38 conducts. As the switch 38 conducts, current is drawn through resistor 56, thereby lowering the anode potential on switch 38. This reduction in potential is instantaneously applied through capacitor 58 and bias resistor 60 to the gate of switch 40, thereby causing this latter switch to cut off. As switch 40 cuts off, its anode potential rises such that the output waveform G in FIG. 2 rises in potential as seen following the time $t_2$. The foregoing switching action occurs with extreme rapidity and, hence, the potential in waveform G rises abruptly, creating a square-wave configuration.

The voltage at output terminal 44 will remain at its higher value with current flowing through resistors 42 and 62 until a phase in waveform F is again received on terminal 36 at time $t_3$ in FIG. 2. This pulse is applied through coupling capacitor 64 across resistor 66, thereby causing NPN transistor 68 to conduct. When transistor 68 conducts, current is drawn through resistor 70, thereby lowering the potential at point 72. This potential, applied to the anodes of switches 38 and 40, causes switch 38 to cut off and switch 40 to conduct, whereupon the voltage of waveform G in FIG. 2 falls abruptly as seen following the time $t_3$.

At time $t_4$, another pulse in waveform A is received on terminal 34, whereupon the process is repeated; and it will be appreciated that a square-wave signal (waveform G) is derived in which the cycle of the square wave is repeated once during each rotation of the member 10, e.g., from the time $t_2$ to the time $t_4$. The Zener diode 74 in the circuit of FIG. 3 is utilized for the purpose of establishing a voltage level at which the switching action will occur.

With reference, again, to FIG. 1, the output of the dual trigger bistable multivibrator 19 comprising waveform G in FIG. 2 is applied to an integrator 76 which integrates the square waveform G to produce an integrated triangular waveform illustrated as waveform H in FIG. 2. However, the amplitude of the output waveform H from integrator 76 is frequency-sensitive. That is, if we consider that the fundamental of the square wave G is $E_1 \sin wt$, then the integral of this fundamental will be $$\frac{E_1}{w} \cos wt$$

Therefore, in order to eliminate the frequency factor $w$, a frequency-to-direct-current converter 78 is connected to the output of the dual trigger bistable multivibrator 19, the output of this circuit 78 being represented by the factor $Kw$ where K is a constant determined by the parameters of the circuit 78. By multiplying the factor $Kw$ by $$\frac{E_1}{w} \cos wt$$

in multivibrator 80, the output of the multiplier will be $KE_1 \cos wt$, the amplitude of which is clearly not frequency-sensitive. It will be understood, of course, that the harmonics included in the square-wave signal (waveform G) are multiplied in the same manner to eliminate amplitude variations.

Connected to the frequency-to-direct-current converter 78 is a frequency meter 79 which indicates the frequency of the pulses produced by the photocell 14. The frequency of the pulses produced by photocell 14, in turn, is equal to the frequency of one of the vibration signals sensed by the vibration pickup 16. Hence, the meter 79 serves to indicate the frequency of the rotation.

Figure 4:
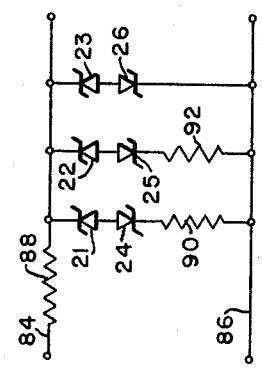
FIG. 4 is a detailed schematic circuit diagram of the sine wave shaper of FIG. 1.

From multiplier 80, the triangular waveform H of FIG. 2 is applied directly to a sine wave shaper 82. Although various types of sine wave shapers may be employed herein, one suitable type is shown in FIG. 4. It includes a pair of input terminals 84 and 86, the terminal 86 being grounded. Terminal 84 is connected through resistor 88 to the cathodes of a first set of Zener diodes Z1, Z2 and Z3. The anodes of Zener diodes Z1, Z2 and Z3 are, respectively, connected to the anodes of a second set of three Zener diodes Z4, Z5 and Z6. The cathodes of Zener diode Z6 is connected directly to ground, whereas the cathodes of Zener diodes Z4 and Z5 are connected to ground through resistors 90 and 92, respectively, the resistor 90 is larger than resistor 92.

Let us assume, for example, that the peak-to-peak voltage of the triangular waveform H in FIG. 2 is 15 volts. Furthermore, it will be assumed that the breakdown voltages of diodes Z1 and Z4 are 3.9 volts; the breakdown voltages of diodes Z2 and Z5 are 4.7 volts and the breakdown voltages of diodes Z3 and Z6 are 5.1 volts. As the positive half cycle of the triangular waveform H of FIG. 2 increases in a positive direction from the zero axis, the diode Z1 will conduct first, followed by conduction of diode Z2 and finally by conduction of diode Z3. As the voltage of waveform H then falls on the positive side of the zero axis, diode Z3 will first cut off, followed by cutting off of diode Z2 and finally cutting off of diode Z1. In this process, the triangular waveform H is rounded off to produce a positive half cycle of the sine wave I as shown in FIG. 2. Similarly, as the triangular waveform H increases in a negative direction below the zero axis, diode Z4 will conduct first, followed by conduction of diode Z5 and finally conduction of diode Z6. As the triangular waveform H rises in a positive direction, but on the negative side of the zero axis, diode Z6 will cut off first, followed by cutting off of diode Z5 and finally cutting off of diode Z4. In this process, the negative half cycle of waveform I is produced. The output of circuit 82 is, therefore, the sine wave I of FIG. 2. This signal is identified as $E_R \angle 0°$ in FIG. 1.

In order to produce a second sine wave which is shifted in phase with respect to sine wave I by 90°, the triangular waveform H at the output of multiplier 80 is first applied through a conductor 93 to a Schmitt trigger circuit 94 which functions in the same manner as the Schmitt trigger circuit 26 previously described. It will be assumed that the predetermined voltage level at which the Schmitt trigger 94 fires is $E_s$–94 illustrated on waveform H in FIG. 2. Consequently, the Schmitt trigger circuit 94 will fire to produce an output pulse whenever the input signal rises above the voltage level $E_s$–94. The result is waveform J in FIG. 2 comprising a square waveform shifted in phase with respect to waveform G by 90°. The waveform J is then integrated in integrator 96 and multiplied in multiplier 98 with the output of the frequency-to-direct-current converter 78. In this respect, compensation for changes in amplitude due to changes in frequency is accomplished in the same manner as it is in multiplier 80. The resulting triangular waveform K in FIG. 2 is then applied to a second sine wave shaper 100 identical to the sine wave shaper 82 previously described. The result is sine wave L in FIG. 2 which is shifted in phase with respect to sine wave I and is identified as $E_R \angle 90°$ in FIG. 1.

The signals $E_R \angle 0°$ and $E_R \angle 90°$ are applied to the band-pass filter apparatus 18 in combination with the vibration signal $E_U$. The filter apparatus 18 is the subject of the aforesaid copending application Ser. No. 359,335, filed Apr. 13, 1964. As shown, it includes a pair of signal channels 102 and 104 each of which includes a first multiplier circuit 106 and 108, respectively. Applied to multiplier circuit 106 is the signal $E_R \angle 0°$ which may be represented mathematically by:

$$E_R \sin wt$$

Similarly, applied to multiplier circuit 108 is the signal $E_R \angle 90°$ which is shifted in phase with respect to $E_R \angle 0°$ by 90° and which may be represented by:

$$E_R \cos wt$$

The signals $E_R \angle 0°$ and $E_R \angle 90°$ are multiplied in circuits 106 and 108 respectively by the vibration input signal $E_U$. If this signal is of the same frequency, $w$ as $E_R \angle 0°$ and $E_R \angle 90°$ it may be represented by:

$$E_U \sin (wt+\theta)$$

where $\theta$ is the difference in phase between the input signal $E_U$ and $E_R \angle 0°$. As will be appreciated, the signal $E_U$ will contain components of the same frequency, $w$, as $E_R \angle 0°$ and $E_R \angle 90°$ since it is due to the vibration ocurring as a result of the rotating member 10 from which the pulses applied to circuit 17 are derived. The signals induced in the pickup 16 due to other vibrating parts, however, will have different frequencies than the frequency, $w$, identified above.

As will be seen, the filter 18 is designed to pass signals having the frequency $w$. Therefore, an input signal represented by the formula:

$$E_U \sin (wt+\theta)$$

derived as a result of vibrations from member 10 will pass through the filter. However, a signal of another frequency, $w_1$, will not pass through the filter. This latter signal can be represented by the formula:

$$E_U \sin(w_1 t)$$

The outputs of multiplier circuits 106 and 108 are fed through low-pass filters 110 and 112, respectively, which eliminate alternating current components, leaving only direct current components which are applied to a second pair of multiplier circuits 114 and 116. In circuits 114 and 116, the direct current outputs of circuits 110 and 112 are multiplied with $E_R \angle 0°$ and $E_R \angle 90°$, respectively, thereby producing alternating current signals which are combined in adder 118 to produce an output on lead 120 when, and only when, the input signal $E_U$ is of the same frequency, $w$, as $E_R \angle 0°$ and $E_R \angle 90°$. In other words, the filter circuit 18 will eliminate all signals other than those due to vibrations of the member 10 from which the pulses applied to circuit 17 were derived. This means, in effect, that if vibration signals are picked up by element 16 due to vibrating parts other than those caused by the rotating member 10, they will not pass through the filter 18.

Figure 5C:
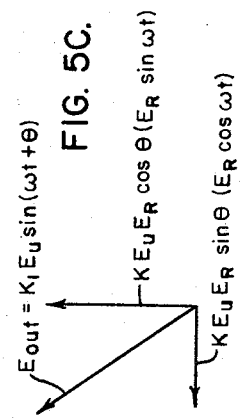
FIGS. 5A, 5B and 5C are vector diagrams illustrating the operation of the synchronous filter of the vibration analyzing apparatus.
Figure 5B:
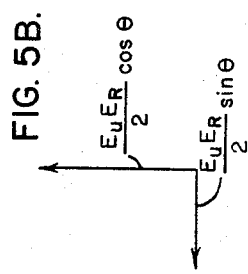
Figure 5A:
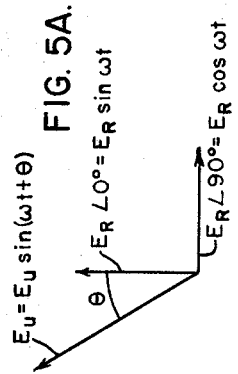

Operation of the filter 18 may best be understood by reference to FIGS. 5A, 5B and 5C. In FIG. 5A, vectors representing $E_R \angle 0°$, $E_R \angle 90°$ and $E_U$ are shown with $E_U$ being equal in frequency to $E_R \angle 0°$ and $E_R \angle 90°$. Thus, $E_R \angle 0°$ and $E_R \angle 90°$ are 90° out of phase with respect to each other, while $E_U$ is shifted in phase with respect to $E_R \angle 0°$ by the angle $\theta$. Multiplication of $E_U$ by $E_R \angle 0°$ in circuit 106 may be represented mathematically as follows:

$$E_R \sin wt \times E_U \sin(wt+\theta) = \frac{E_R E_U}{2}[\cos \theta - \cos(2wt+\theta)]$$

Similarly, multiplication of $E_U$ by $E_R \angle 90°$ in circuit 108 may be represented as:

$$E_R \cos wt \times E_U \sin(wt+\theta) = \frac{E_R E_U}{2}[\sin \theta + \sin(2wt+\theta)]$$

The voltages, $$\frac{E_R E_U}{2}[\cos \theta - \cos(2wt+\theta)]$$

and $$\frac{E_R E_U}{2}[\sin \theta + \sin(2wt+\theta)]$$

appear at the outputs of multipliers 106 and 108, respectively. After passing through filters 110 and 112, the alternating current components are eliminated, leaving only the direct current components:

$$\frac{E_R E_U}{2}\cos \theta$$

and $$\frac{E_R E_U}{2}\sin \theta$$

respectively at the outpus of filters 110 and 112 in FIG. 1. These direct current voltages are vectorially represented in FIG. 5B.

The direct current components are then multiplied by $E_R \angle 0°$ and $E_R \angle 90°$, respectively, in circuits 114 and 116 to produce a signal represented by:

$$K E_U E_R \cos \theta (E_R \sin wt)$$

at the output of circuit 114, and $$K E_U E_R \sin \theta (E_R \cos wt)$$

at the output of circuit 116. K is a multiplication constant associated with the circuitry and can be neglected for purposes of explanation. Perfect sine waves now appear at the outputs of multipliers 114 and 116 in the circuit of FIG. 1. These two signals are shown in FIG. 5C having the same phase separation as $E_R \angle 0°$ and $E_R \angle 90°$ and an amplitude proportional to the unknown input signal $E_U$. Therefore, addition of the voltages in adder 118 produces an output which is mathematically represented by:

$$K_1 E_U \sin(wt+\theta)$$

This signal is of the same frequency as $E_R \angle 0°$ and $E_R \angle 90°$, has the same phase as $E_U$ at the input, and occurs only when the frequency of $E_U$ at the input is equal to the frequency of $E_R \angle 0°$ and $E_R \angle 90°$. It should be noted that no phase shift whatever has occurred in the signal in passing through the filter. Furthermore, the tuned or center frequency of the filter automatically coincides with the instantaneous frequency of $E_R \angle 0°$ and $E_R \angle 90°$.

Now, if it is assumed that the frequency of $E_U$ is not the same as that of $E_R \angle 0°$ and $E_R \angle 90°$, then $E_U$ may, for example, be represented as:

$$E_U = E_U \sin w_1 t$$

where $w_1$ is a frequency different from the frequency, $w$, of signals $E_R \angle 0°$ and $E_R \angle 90°$. Then, multiplication in circuit 106, for example, will produce:

$$E_U \sin w_1 t \times E_R \sin wt = E_U E_R \sin w_1 t \sin wt$$
$$= \frac{E_U E_R}{2}[\cos(w_1-w)t - \cos(w_1+w)t]$$

A similar multiplication occurs in circuit 108, and it can be seen that the product contains no direct current component. Consequently, at all other frequencies other than the frequency, $w$, the filters 110 and 112 will reject everything, and no output appears.

The output signal comprising $E_U$ may then be applied through a manually adjustable band-pass filter 122 to an amplitude meter 124. The filter 122 may be employed, if desired, to employ finer filtering of the vibration signal $E_U$.

Thus, the frequency of the vibration signal is indicated by frequency meter 79, and its amplitude indicated by amplitude meter 124. In order to determine the phase of the vibration signal, a phase meter 125 is provided. The phase meter 125 comprises a pair of coils 126 and 128 connected in series and having their axes lying in the same plane at 90° with respect to each other. The ends of the series-connected coils 126 and 128 are connected to the outputs of filters 110 and 112, respectively, such that the direct current signals:

$$\frac{E_U E_R}{2}\cos \theta$$

and $$\frac{E_U E_R}{2}\sin \theta$$

are applied to the coils 126 and 128, respectively, in series opposition. This will produce a combined magnetic field, the orientation of which is dependent upon the relative strengths of the two direct current voltages. By providing a pointer 130 at the junction of the two coils 126 and 128 and permitting the pointer to rotate through a complete 360° arc about an axis extending perpendicular to the axes of the coils 126 and 128 and in a plane parallel to the plane of the coil axes, the pointer 130 will assume an orientation determined by the relative strengths of the two direct current voltages. This assumes, of course, that the pointer 130 is permanently magnetized as indicated. The angular orientation of the pointer 130, therefore, will correspond to the phase of $E_U$, the unbalance signal.

Figure 6:
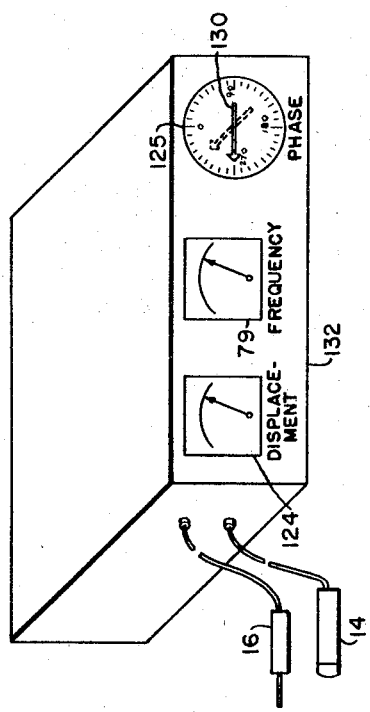
FIG. 6 is a perspective view of a console incorporating the novel phase meter of the invention.

With reference, now, to FIG. 6, a console 132 is shown which contains the circuitry shown in FIG. 1 and has on one face thereof the frequency meter 79, the amplitude or displacement meter 124 and the phase meter 125 having a pointer 130 which indicates a complete 360° phase angle as explained above. Also connected to the console 132 is the vibration pickup 16 and the photocell 14.

In a balancing operation, the vibration pickup 16 and photocell 14 are operatively associated with the rotating member 10 as shown in FIG. 1. It is a characteristic of rotating bodies that they pass through resonant speeds of rotation at which the vibration signal is erratic. This can be sensed in accordance with the present invention by observing the pointer 130 on the phase meter 125. When the rotating member is at a resonant frequency, the pointer 130 will sweep back and forth somewhat erratically. Between the resonant frequencies, however, the pointer 130 will assume a fixed position. Therefore, by increasing the speed of the member 10 from a low value to a higher value, the periods of resonance can be plotted. This is a distinct advantage of the present invention over prior-art vibration analyzing devices wherein there was no convenient means of determining whether a balancing operation was being attempted at a resonant frequency where erratic results would be obtained.

Figure 7:
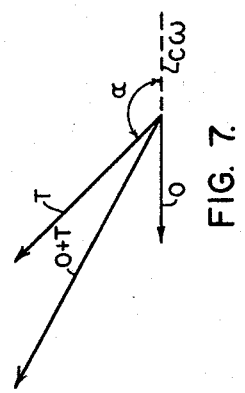
FIG. 7 is a vector diagram illustrating a balancing operation in accordance with the teachings of the invention.

In order to effect a balancing operation, a speed is selected at which the pointer 130 assumes a fixed position. Let us assume, for example, that the pointer is in the position shown in FIG. 6, indicating a phase angle of 270°. Furthermore, let us assume that the displacement indicated by meter 124 is 2.5 mils. Vectorially, this can be represented as shown in FIG. 7 by the vector identified as 0. If we now stop the rotating member 10 and add a trial weight at any desired point around its periphery, and then cause the member 10 to rotate at the same speed as it was rotating before (as indicated by meter 79), the meter 125 may assume a phase angle of 300° as indicated by the dotted line pointer in FIG. 6 and the displacement meter 124 may indicate 6 mils. This may be represented vectorially in FIG. 7 by the vector identified as 0+T.

Thus, the original unbalance (0) in the member 10 was represented by 2.5 mils and a phase angle of 270°. After adding a trial weight, the unbalance due to both the original plus the trial weight (0+T) is represented by 6 mils at a phase of 300°. In FIG. 7, the length of the vectors are, of course, proportional to the amounts of unbalance, which means that the vector 0 is proportional to the 2.5 mils and the vector 0+T is proportional to 6 mils. Since the vector 0+T is the sum of the vectors due to the original unbalance and that due to the trial weight, by vector resolution we find that the trial weight T has a value of 4.04 mils at an angle of 318°. In order to balance the rotating body, a corrective weight CW must be added which is equal and opposite to the original unbalance 0. This is shown by the dotted vector (CW) in FIG. 7. Furthermore, it is known that the corrective weight must be displaced from the position of the trial weight previously placed on the rotating body by the angle α. The magnitude of the corrective weight may be determined from the following relationship:

$$CW = \frac{T}{O} \times \text{trial weight}$$

In the example given above, therefore, the corrective weight will be:

$$CW = \frac{2.5}{4.04} = 0.62 \times \text{trial weight}$$

Assuming that the trial weight weighed 10 grams, then the corrective weight must weigh 6.2 grams and be displaced 132° with respect to the position of the trial weight. In the example given, the corrective weight will be displaced in a clockwise direction with respect to the trial weight by 132°. Therefore, by removing the trial weight and by placing a corrective weight of 6.2 grams on the body at a point removed 132° clockwise with respect to the position of the trial weight, the body should be balanced. This will be indicated by a very low reading on the displacement meter 124 in a subsequent "proving" determination.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, static circuit apparatus for simultaneously producing two sine wave signals each having a frequency equal to the speed of the rotating body and displaced in phase with respect to each other by 90°, a phase meter having pointer means magnetized to produce fixed north and south poles at its opposite ends and rotatable about a complete 360° arc, magnetic field generating means in said phase meter responsive to said sine wave signals and the displacement signal and operative on the pointer to cause it to rotate to a position indicating the phase of the displacement signal with respect to said sine wave signals, and circuit apparatus operatively connecting said sine wave producing means and said electromagnetic transducer to the magnetic field generating means.

2. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for producing a pulse once during each revolution of the rotating body, static circuit means operatively connected to said pulse producing means for simultaneously producing a pair of sine wave signals each having a frequency equal to the speed of the rotating body and displaced in phase with respect to each other by 90°, a phase meter operable in response to both of said sine wave signals and the displacement signal, said phase meter having pointer means magnetized to produce fixed north and south poles at its opposite ends and rotatable about a complete 360° arc, and magnetic field generating means in said phase meter responsive to said sine wave signals and to said displacement signal for rotating said pointer to a position where it indicates the phase of the displacement signal with respect to said sine wave signals.

3. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for producing a pulse once during each revolution of the rotating body, means including static circuit means and a frequency meter operatively connected to the pulse producing means for indicating the speed of rotation of said body, a phase meter having pointer means magnetized to produce fixed north and south poles at its opposite ends and movable through a complete 360° indication for indicating the phase of the displacement signal with respect to the pulses produced once during each revolution of the rotating body, and circuit apparatus operatively connecting the means for producing pulses and the electromagnetic transducer to said phase meter.

4. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for producing a pulse once during each revolution of the rotating body, static circuit means responsive to said pulses for simultaneously producing a pair of sine wave signals each having a frequency equal to the speed of rotation of the rotating body and displaced 90° with respect to each other, a phase meter having pointer means magnetized to produce fixed north and south poles at its opposite ends and rotatable about a complete 360° arc, and magnetic field generating means operatively connected to said static circuit means and the electromagnetic transducer and operative on said pointer to cause the pointer to rotate to a position where it indicates the phase of the displacement signal with respect to at least one of said sine wave signals.

5. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for producing a pulse once during each revolution of the rotating body, circuit means responsive to said pulses for producing two sine wave signals each having a frequency equal to the speed of rotation of the rotating body and displaced 90° in phase with respect to each other, a pair of circuit devices each responsive to said displacement signal and an associated one of said sine wave signals for producing a direct current voltage, means for indicating the phase of the displacement signal with respect to the sine wave signals and comprising a pointer magnetized to produce north and south magnetic poles at its opposite ends and rotatable about an axis extending perpendicular to a line drawn between the poles, a pair of induction coils disposed at right angles to each other in a plane extending parallel to the plane of rotation of said pointer, the axes of the induction coils intersecting the axis of rotation of the pointer, and means connecting the induction coils in series between the outputs of said circuit devices for producing direct current voltages whereby the pointer will assume a position about a complete 360° arc indicative of the phase relationship between the displacement signal and the sine wave signals.

6. In electronic vibration analyzing apparatus, the combination of an electromagnetic transducer operatively connected to a rotating body to be balanced and adapted to produce a displacement signal having an amplitude and phase dependent upon the amount and location of unbalance in a rotating body, means for producing a pulse once during each revolution of the rotating body, apparatus responsive to said pulsed signal for generating a square-wave signal which changes voltage levels each time an input pulse is applied thereto, means coupled to the output of said square-wave generating apparatus for producing a triangular waveform having an amplitude which is constant regardless of the frequency of the square-wave signal, a first sine wave shaper coupled to the output of said triangular waveform producing means, means including a second sine wave shaper coupled to the output of said triangular waveform producing means for producing a sine wave signal which is shifted in phase 90° with respect to the sine wave signal produced by the first sine wave shaper, means responsive to said sine wave signals and said displacement signal for producing a plurality of direct current voltages, and a phase meter responsive to said direct current voltages and having a pointer rotatable about a complete 360° arc for indicating the phase of the displacement signal with respect to the pulses produced once during each revolution of the rotating body.

7. In electronic vibration analyzing apparatus, the combination of an electromagnetic transducer operatively connected to a body to be balanced and adapted to produce a displacement signal having an amplitude and phase dependent upon the amount and location of unbalance in a rotating body, means operatively associated with the rotating body for producing two sine wave signals having a frequency proportional to the speed of rotation of the rotating body and displaced 90° in phase with respect to each other, a pair of circuit devices each responsive to said displacement signal and an associated one of said sine wave signals for producing a direct current voltage, means for indicating the phase of said displacement signal with respect to the sine wave signals and comprising a pointer magnetized to produce north and south magnetic poles at its opposite ends and rotatable about an axis extending perpendicular to a line drawn between the poles, and a pair of induction coils connected in series between the outputs of said circuit devices and inductively associated with said pointer whereby the pointer will assume a position about a complete 360° arc indicative of the phase displacement between the displacement signal and the sine wave signals.

8. In electronic vibration analyzing apparatus, the combination of an electromagnetic transducer operatively connected to a body to be balanced and adapted to produce a displacement signal having an amplitude and phase dependent upon the amount and location of unbalance in a rotating body, means operatively associated with the rotating body for producing two sine wave signals having a frequency proportional to the speed of rotation of the rotating body and displaced 90° in phase with respect to each other, a pair of circuit devices each responsive to said displacement signal and an associated one of said sine wave signals for producing a direct current voltage, and means for indicating the phase of said displacement signal with respect to the sine wave signals, said latter-mentioned means comprising a pointer magnetized to produce north and south magnetic poles at its opposite ends and rotatable about an axis extending perpendicular to a line drawn between the poles, a pair of induction coils disposed at right angles to each other in a plane extending parallel to the plane of rotation of said pointer, the axes of the induction coils intersecting the axis of rotation of the pointer, and means connecting the induction coils in series between the outputs of said circuit devices whereby the pointer will assume a position about a complete 360° arc indicative of the phase relationship between the displacement signal and said sine wave signals.

9. In electronic vibration analyzing apparatus, the combination of an electromagnetic transducer operatively connected to a body to be balanced and adapted to produce a displacement signal having an amplitude and phase dependent upon the amount and location of unbalance in a rotating body, means operatively associated with the rotating body for producing two sine wave signals having a frequency proportional to the speed of rotation of the rotating body and displaced 90° in phase with respect to each other, a pair of signal channels, means in each of said channels responsive to an associated one of said sine wave signals and said displacement signal for producing a direct current voltage in that channel, and means for indicating the phase of said displacement signal with respect to the sine wave signals, said latter-mentioned means comprising a pointer magnetized to produce north and south magnetic poles at its opposite ends and rotatable about an axis extending perpendicular to a line drawn between the poles, a pair of induction coils disposed at right angles to each other in a plane extending parallel to the plane of rotation of said pointer, the axes of the induction coils intersecting the axis of rotation of the pointer, and means connecting the induction coils in series across said signal channels such that the direct current voltages in the channels are applied across the induction coils in series opposition, the arrangement being such that the pointer will assume a position about a complete 360° arc indicative of the phase relationship between the displacement signal and the sine wave signals.

10. In electronic vibration analyzing apparatus, the combination of an electromagnetic transducer operatively connected to a body to be balanced and adapted to produce a displacement signal having an amplitude and phase dependent upon the amount and location of unbalance in a rotating body, means operatively associated with the rotating body for producing two sine wave signals having a frequency proportional to the speed of rotation of the rotating body and displaced 90° in phase with respect to each other, a pair of signal channels, multiplication circuit means in each of said chanels responsive to an associated one of said sine wave signals and said displacement signal for producing composite signals in each channel, each of said composite signals having an alternating current component and a direct current component which exists only when the displacement signal is of the same frequency as said sine wave signals, filter means in each of said channels for eliminating alternating current components whereby a direct current component will appear at the output of the filter means in each channel only when the frequency of the displacement signal is equal to the frequency of the sine wave signals, and means for indicating the phase of said displacement signal with respect to the sine wave signals, said latter-mentioned means comprising a pointer magnetized to produce north and south magnetic poles at its opposite ends and rotatable about an axis perpendicular to a line drawn between the poles, a pair of induction coils disposed at right angles to each other in a plane extending parallel to the plane of rotation of said pointer, the axes of the induction coils intersecting the axis of rotation of the pointer, and means connecting the induction coils in series between the outputs of said filter means in each channel whereby the pointer will assume a position about a complete 360° arc indicative of the phase relationship between the displacement signal and the sine wave signals.

11. The combination of claim 10 and including second multiplying means in each of said channels for multiplying said direct current voltage by an associated one of said sine wave signals, means for adding the outputs of said second multiplying means in each channel, and an amplitude meter connected to the output of said adding means for indicating the amplitude of the displacement signal.

References Cited

UNITED STATES PATENTS

| | | | |
|---|---|---|---|
| 2,451,863 | 10/1948 | Oakley | 73—463 XR |
| 2,731,835 | 1/1956 | Hellar et al. | 73—463 |
| 2,933,984 | 4/1960 | Hack | 73—463 XR |
| 3,091,125 | 5/1963 | Budnick et al. | 73—462 |
| 3,228,251 | 1/1966 | Trimble | 73—463 XR |

RICHARD C. QUEISSER, *Primary Examiner.*

JAMES J. GILL, *Assistant Examiner.*